United States Patent Office 3,629,293
Patented Dec. 21, 1971

3,629,293
SYNTHESIS OF 5-METHYL-4-HYDROXY-2,3-
DIHYDROFURAN-3-ONE
Hendricus Gerardus Peer and Godefridus Antonius Maria
van den Ouweland, Zevenaar, Netherlands, assignors
to Lever Brothers Company, New York, N.Y.
No Drawing. Filed Sept. 17, 1968, Ser. No. 760,351
Claims priority, application Netherlands, Sept. 18, 1967,
6712748
Int. Cl. C07d 5/10
U.S. Cl. 260—347.8
7 Claims

ABSTRACT OF THE DISCLOSURE

This invention provides a process for the preparation of 5-methyl-4-hydroxy-2,3-dihydrofuran-3-one from a glycosylamine prepared from a secondary aliphatic or aromatic amine and an aldopentose. The N.N-disubstituted glycosylamine is heated in the presence of a polar solvent and a specific proportion of carboxylic acid.

---

The invention relates to an improved synthesis of 5-methyl-4-hydroxy-2,3-dihydrofuran-3-one.

This compound has been described in "Zeitschrift für Lebensmittel-Untersuchung und Forchung," vol. 134, No. 4, of Aug. 10, 1967, page. 231, and was prepared by the reaction of 3 moles L-arabinose, 1 mole of tryptamine and acetic acid in water by heating at 100–150° C. for several hours. More generally the compound could be prepared from a pentose, a primary amine and acetic acid (molar ratio 3:1:1) and yields from 0.25 to 0.4% calculated on the pentose starting material and a melting range of 122–127° C. have been obtained. A similar reaction, yielding a homologue, viz 2,5-dimethyl-4-hydroxy-2,3-dihydrofuran-3-one using L-rhamnose and piperidine acetate, is described by J. E. Hodge in U.S. specn. 2,936,308. The conditions involve heating the reactants at 75° C. for 18 hours in ethanol and 26% of the desired compound was obtained (cf. Example II). This specification also discloses reacting D-xylose with piperidine acetate under similar conditions, but no crystalline product could be isolated or identified.

These experiments described by Hodge have been repeated several times and the crude reaction products have been subjected to gas/liquid chromatography and the main components identified by means of, among other things infra-red and mass spectrometry. When repeating the experiment with L-rhamnose, the reaction product was found to contain the desired 2,5-dimethyl-4-hydroxy-2,3-dihydrofuran-3-one together with about 25% of a nitrogen containing by-product, viz 2,5-dimethyl-4-piperidino-2,3-dihydrofuran-3-one, which contaminant was difficult to remove. This nitrogenous compound is different in structure from the nitrogen containing reductones described by J. E. Hodge and also showed different properties. Unlike the nitrogen containing reductones, hydrolysis under acidic conditions and under the influence of heat does not produce the desired nitrogen-free compound.

When repeating the experiment with D-xylose with piperidine acetate no 5-methyl-4-hydroxy-2,3-dihydrofuran-3-one could be detected. However, the reaction mixture was found to contain an appreciable quantity of 5-methyl-4-piperidino-2,3-dihydrofuran-3-one.

From the above, particularly from "Zeitschrift für Lebensmittel-Untersuchung und Forschung," it is evident that when reacting an aldopentose and an amine via the glycosylamine, various concurrent reactions will occur and generally complex reaction mixtures will be obtained in which the various reaction products will be present only in small quantities.

The reaction sequence yielding 5-methyl-4-hydroxy-2,3-dihydrofuran-3-one from and aldopentose and an amine proceeds via an N-substituted glycosylamine, which compound is thought to rearrange and decompose under the influence of a carboylic acid to the 4-hydroxy-dihydrofuranone compound (Amadori-rearrangement). In earlier literature the glycosylamines are sometimes referred to as N-glycosides.

It has now been found that relatively pure 5-methyl-4-hydroxy-2,3-dihydrofuranone-3-one can be prepared in considerable yields by Amadori-rearrangement of certain glycosylamines, viz those derived from an aldopentose and a particular group of secondary amines under the catalytic influence of a particular group of acids under suitable conditions.

Accordingly, the present invention provides a process for the preparation of 5-methyl-4-hydroxy-2,3-dihydrofuran-3-one, in which an N.N-disubstituted glycosylamine of the general formula

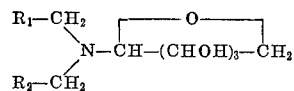

in which $R_1$ and $R_2$ represent the same or different groups and each may be both a hydrogen atom or an aliphatic or aromatic hydrocarbon group, the total number of carbon atoms of which is at most 40, is heated in a polar solvent with an aliphatic carboxylic acid containing at least two carbon atoms per carboxyl group present and in which the amount of carboxylic acid, expressed in equivalents, is between 1.5 and 50, calculated on the amount of glycosylamine.

Glycosylamine which can be converted according to the invention are those derived from aldopentoses, such as xylose, arabinose, ribose and lyxose on the one hand and from a secondary amine on the other hand, with the general formula

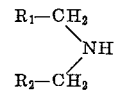

in which $R_1$ and $R_2$ represent the groups indicated above, such as diethyl amine, dipropyl amine, dibutylamine, dihexylamine, dioctylamine, methylnonylamine, methyldodecylamine, didodecylamine and dioctadecylamine. The use of those glycosylamines derived from amines in which $R_1$ and $R_2$ contain together at most 20 carbon atoms is particularly preferred. Of these N.N-disubstituted glycosylamines both mirror image isomers and their anomeric forms (differing in configuration at the first carbon atom) as well as mixtures thereof especially equilibrium mixtures may be used. Also such derivatives of the glycosylamines may be used which are converted into the glycosylamines under the reaction conditions.

The N.N-disubstituted glycosylamines may be prepared in a simple manner by reacting the aldopentose with a secondary amine in a suitable solvent. It is preferred to react the saccharide and the amine in about equimolar quantities and the reaction usually proceeds almost quantitatively. It is not necessary to isolate the glycosylamine from the reaction mixture, because the conversion of the glycosylamine into the dihydrofuranone can usually be effected in the same solvent.

The conversion of the glycosylamine into the dihydrofuranone is carried out in the presence of a carboxylic acid containing at least two carbon atoms per carboxyl group. The use of aliphatic carboxylic acids containing at least two carbon atoms is particularly preferred. The acid may contain up to 22 carbon atoms, but preferably less than 6 carbon atoms. Acetic acid, propionic acid and butyric acid are preferably used. Aliphatic di- or polycarboxylic acids may also be used, e.g. succinic acid, glutaric acid, adipic acid and citric acid. The acids may be used in quantities varying from about equivalent to the glycosylamine to 50 equivalents. Particularly high yields of dyhydrofuranone can be obtained by using ratios of 1.5 to 6 equivalents. Best results are generally obtained with equivalent quantities between 2 and 5 (acid to glycosylamine).

The results of some experiments with xylose, diethylamine (1:1 molar) and acetic acid in various molar quantities in methanol as a solvent at a reaction temperature of 65° C. are tabulated below. At various levels of carboxylic acid addition the relative yields (deduced from the surface area of the relevant gaschromatographic peaks) have been determined after reaction periods of 1, 3, 5 and 8 hours.

| Equivalents of acid per equivalent glycosylamine | 1 hour | 3 hours | 5 hours | 8 hours |
|---|---|---|---|---|
| 0.5 | | 5 | 5-10 | 5-10 |
| 1 | 30-40 | 40-50 | 40 | 30 |
| 2 | 90 | 130 | 100 | 0 |
| 3 | 100 | 120 | 110-120 | 90-100 |
| 4 | 80-90 | 100 | 110 | 100 |
| 5 | 70 | 80 | 90 | 90-100 |
| 6 | | | | 80 |
| 7 | | | | 60 |
| 10 | 25-35 | | | |
| 20 | 20 | | | |
| 50 | 10 | | | |

The reaction can be carried out at temperatures from 20 to 120° C., preferably between 50 and 80° C. A reaction period of 0.5 to 15 hours being feasible in general, it is preferred to carry out the heating to between 50 and 80° C. for a period of 3 to 8 hours. At higher temperatures increasing amounts of interfering by-products will be formed.

Suitable solvents in which the glycosylamines are dissolved when carrying out the conversion to the dihydrofuranone are polar organic solvents such as lower aliphatic alcohols containing 1-6 carbon atoms, dimethylsulfoxide, N,N-dimethylformamide, etc. It is also possible to use mixtures of such solvents, as well as mixtures with water in which, in order not to affect the yield adversely, up to 50% of water may be used. Higher amounts of water up to 70% may occasionally also be used, dependent on the glycosylamine. The amount of solvent used depends on the solubility of the glycosylamine; usually 2-25 times the amount of glycosylamine by weight is used.

The conversion may be carried out under atmospheric pressure, or at an elevated pressure, the latter if conversions are affected when a volatile lower amine is used or when higher temperatures are applied.

The following table gives some results obtained from glycosylamines derived from xylose and amine. Solvent, reaction temperature, reaction time and yields (gaschromatography) are indicated.

| Amine | Solvent | Temp. (° C.) | Duration (h.) | Yield (percent) |
|---|---|---|---|---|
| Diethyl | Methanol | 25 | 100 | ca. 2 |
| | do | 65 | 3 | 18 |
| | Ethanol | 65 | 3 | 20 |
| | Propanol | 65 | 3 | 18 |
| | do | 100 | 0.5 | 7 |
| | Butanol | 120 | 0.25 | 1 |
| Dibutyl | Ethanol | 65 | 3 | 9 |
| | do | 80 | 1 | 6.5 |

It is not necessary to carry out the formation of the glycosylamine in a separate step and subsequently convert it into the dihydrofuranone. The aldopentose may be reacted with the amine in the presence of a carboxylic acid, e.g. acetic acid, so in fact the dihydrofuranone compound can be obtained in one step from the dialkyl ammonium acetate. In this case the amine acts as a catalyst and then considerably smaller proportions than the equimolar proportions will suffice.

When an aldopentose is used in stoichiometric excess with respect to amine the amount of glycosylamine present in the reaction mixture may be relatively low and consequently the amount of carboxylic acid required to bring about the conversion is low.

In view of the fact that the dihydrofuranone easily oxidises, it is desirable to carry out the reaction in an inert atmosphere, e.g. under nitrogen.

After conclusion of the reaction the reaction product is worked up in the conventional way. To that end the solvent may be distilled off under reduced pressure and the residue taken up in water and extracted with, for example, ether. After evaporating the ether the desired dihydrofuranone is obtained in a crude form, mostly in yields from about 10 to 40 percent, calculated on the glycosylamine. The reaction products thus obtained contain little or no nitrogen containing by-products. If desired, these products can be further purified, e.g. by means of column chromatography or by recrystallization.

5-methyl-4-hydroxy-2,3-dihydrofuran-3-one is a compound showing pronounced reducing properties, which makes it useful as antioxidant and photographic developer. In addition this compound is valuable in certain meaty compositions.

EXAMPLE 1

In a 250 ml. three-necked flask carrying a thermometer, a stirrer and a dropping funnel, 10 g. (0.07 mole or equivalent) of D-(+)-xylose were stirred with 60 ml. of 96% ethanol at 60 to 65° C. under a nitrogen atmosphere. Within a few minutes 4.9 g. (0.07 mole or equivalent) of diethylamine were added and stirring was continued while maintaining the same temperature until the mixture became homogeneous (2.5 to 3 hours). From mass-spectrometrical data it appeared that the N.N-diethylxylosylamine had formed practically quantitatively, which was concluded from the appearance of a parent peak of the diethylxylosylamine (205) and the disappearance of the parent peaks of the starting materials.

12 g. (0.2 mole or equivalent) of glacial acetic acid dissolved in 10 ml. of ethanol were added in 5 minutes to the red, clear solution thus obtained. Stirring at 60 to 65° C., was continued for 3 hours, during which the colour of the reaction mixture changed into a deep red. The mixture was cooled and the solvent distilled off under reduced pressure, care being taken that the temperature of the mixture did not rise to more than 35° C.

The dark red residue was dissolved in 150 ml. of water; the aqueous solution was extracted continuously with diethylether for 12 hours. The ethereal extract was dried with anhydrous sodium sulphate; the ether was evaporated. The reaction product was purified by chromatographing it over a column of 50 g. of polyamide, viz. the polyamide-SC 6 ex Macherey-Nagel & Co., Duren, Germany, consisting of polycaprolactam, which polyamide does not contain olige- or lower polymer components, and the particle size of which is not larger than 160 μm. With petroleum ether eluted only traces of substances not further identified. With a mixture (20:80) of diethylether and petroleum ether 1.37 g. of 5-methyl-4-hydroxy - 2,3 - dihydrofuran-3-one eluted, which after evaporation of the solvent was left as a white solid. This is a yield of 18% calculated on xylose. After recrystallisation from a mixture (20:80) of diethylether and petroleum ether the melting point was 126.5 to 127.5° C.

EXAMPLE 2

Using the techniques of Example 1 the substance was obtained in a yield of 1.12 g. (=15%), starting however, from a mixture of 10 g. of xylose and 20 ml. of ethanol. After adding the diethylamine the reaction mixture became homogeneous already after 5 minutes.

EXAMPLE 3

Using the techniques of Example 1 the substance was obtained from a mixture of 5.0 g. (0.033 mole) of L-

(+)-arabinose and 80 ml. of ethanol. After adding 2.45 g. of diethylamine (0.33 mole or equivalent) dissolved in 10 ml. of ethanol the reaction mixture became homogeneous after 3 hours, and it had obtained a dark red colour. After adding 6 g. (0.1 mole or equivalent) of glacial acetic acid in 5 ml. of ethanol and heating for 3 hours the colour became dark brown. After chromatographing over 20 g. of polyamide 0.56 g. (=15%) of the 5-methyl-4-hydroxy-2,3-dihydrofuranone-3 was obtained as a white solid.

EXAMPLE 4

Using the techniques of Example 3 the substance was obtained in a yield of 0.49 g. (=13%) by starting from a mixture of 5.0 g. (0.03 mole or equivalent) of arabinose and 30 ml. of methanol and adding 2.45 g. of diethylamine (0.033 mole or equivalent) and 6 g. (0.1 mole or equivalent) of glacial acetic acid.

EXAMPLE 5

Using the techniques of Example 1, the substance was obtained from a mixture of 5.0 g. (0.033 mole) of D-(—)-ribose and 15 ml. of ethanol. After adding 2.45 g. (0.033 mole or equivalent) of diethylamine in 5 ml. of ethanol the reaction mixture became homogeneous in 3 hours; the colour was yellow-orange. After adding 6 g. (0.1 mole or equivalent) of glacial acetic acid in 5 ml. of ethanol and heating for 3 hours the colour was deep red. After chromatographing over 25 g. of polyamine 0.68 g. (=18%) of the desired product was obtained.

EXAMPLE 6

Using the techniques of Example 5 the substance was obtained from a mixture of 5 g. of ribose and 10 ml. of methanol in a yield of 0.52 g. (=14%).

EXAMPLE 7

In the apparatus of Example 1 2.5 g. (0.016 mole) of D-(+)-xylose were stirred with 50 ml. of 96% ethanol at 60 to 65° C. under a nitrogen atmosphere. Within a few minutes 2.15 g. (0.016 mole or equivalent) of dibutylamine dissolved in 5 ml. of ethanol were added. Stirring was continued at the same temperature until the mixture became homogeneous (90 minutes). To the light red solution 3 g. (0.05 mole) of glacial acetic acid in 5 ml. of ethanol were added in 5 minutes. Stirring at 60 to 65° C. was continued for 3 hours, during which the colour of the reaction mixture became dark red. It was further worked up as indicated in Example 1. After chromatographing over 20 g. of polyamide 0.17 g. (=9%) of the desired substance was obtained.

EXAMPLE 8

Using the techniques of Example 7 a mixture of 5 g. (0.033 mole) of xylose and 30 ml. of methanol was converted with 4.3 g. (=0.033 mole or equivalent) of dibutylamine in 5 ml. of methanol. After 20 minutes a clear, light yellow solution was obtained, which colour after the addition of 6 g. (0.1 mole) of acetic acid in 5 ml. of methanol became light red. After chromatographing over 30 g. of polyamide 0.27 g. (=7%) of the desired substance was obtained.

EXAMPLE 9

Using the techniques of Example 1 the substance was obtained by starting from a mixture of 2.5 g. (0.016 mole) of D-(+)-xylose and 40 ml. of propanol-1, to which 1.22 g. (0.016 mole or equivalent) of diethylamine in 5 ml. of propanol were added. The mixture became homogeneous after 4 hours; its colour was red. After adding 3 g. (0.05 mole) of glacial acetic acid and heating the colour had become dark red. After chromatographing over 12 g. of polyamide 0.34 g. (=18%) of the desired product was obtained.

EXAMPLE 10

In a similar way to Example 9 the substance was obtained by stirring 1.0 g. (0.0067 mole) of D-(+)-xylose with 1.2 g. (0.0067 mole or equivalent) of di-n-hexylamine in 10 ml. of methanol at 65° C. After about 15 minutes 1.2 g. (0.02 mole) of glacial acetic acid was added to the colourless, clear solution; the mixture obtained is heated at 65° C. for 3 hours. After evaporating the solvent a red residue was left, which was worked up as in the preceding examples. After chromatographing twice over a column of polyamide about 50 mg. (=7%) of the desired substance was obtained.

EXAMPLE 11

In a similar way to Example 10 the substance was obtained in a yield of about 60 mg. (=9%) from 1.0 g. of xylose and 1.6 g. (0.0067 mole or equivalent) of di-n-octyl-amine. Here, too, a clear, colourless solution was obtained after 15 minutes, and after evaporation of the solvent after heating with 1.2 g. of glacial acetic acid a red residue remained.

EXAMPLE 12

1.0 g. (0.0067 mole) of xylose was stirred with 0.87 g. (0.0067 mole or equivalent) of dibutylamine and 15 ml. of ethanol at 65° C. After 45 minutes the mixture had become clear and light yellow. 1.2 g. (0.02 mole) of glacial acetic acid were added, and the mixture obtained was heated at 80° C. for 1 hour. The solution had then become dark red. The ethanol was evaporated and the residue worked up as indicated in the preceding examples. After chromatography over a column of polyamide 45 mg. (=6.5%) of the desired product was obtained.

EXAMPLE 13

1.0 g. (0.0067 mole) of xylose was stirred with 0.5 g. (0.0067 mole or equivalent) of diethylamine and 50 ml. of propanol at 65° C. After 2.5 hours the solution had become clear and dark yellow. 1.2 g. (0.02 mole) of glacial acetic acid were added, and the solution was heated at 100° C. for 30 minutes. The solvent was evaporated from the reddened solution and the residue worked up as described in the preceding examples. By column chromatography 50 mg. (=7%) of the desired dihydrofuranone was finally obtained.

EXAMPLE 14

1.0 g. (0.0067 mole) of xylose was stirred with 0.5 g. (0.0067 mole or equivalent) of diethylamine in 5 ml. of methanol at 65° C. To the clear, colourless solution, which was obtained after 10 minutes, 1.76 g. (0.02 mole) of butyric acid was added and the whole solution was heated for 4 hours at 65° C. After evaporation of the solvent the red residue was worked up as in the preceding examples. After column chromatography 70 mg. (=10%) of the desired product was obtained. Under comparable conditions using 0.006 mole butyric acid a yield of 4% of the product was obtained.

EXAMPLE 15

5.0 g. (0.033 mole) of D-(+)-xylose was stirred with 2.23 g. (0.033 mole or equivalent) of diethylamine and 15 ml. of dimethylsulfoxide at 60° C. To the practically clear, colourless solution obtained after 10 minutes were added 6 g. (0.1 mole) of glacial acetic acid; the whole solution was then heated at 60° C. for a further 3 hours, after which the solvent was evaporated in vacuo. The dark residue was further worked up as indicated in the preceding examples. After column chromatography 690 mg. (=18%) of 5-methyl-4-hydroxy-2,3-dihydrofuran-3-one was obtained, which was practically pure.

EXAMPLE 16

Using the techniques of Example 15 the reaction was carried out with N,N-dimethylformamide as the solvent.

The phenomena were practically the same. After column chromatography 610 mg. (=16%) of the product were obtained.

EXAMPLE 17

2.5 g. (0.016 mole) of D-(+)-xylose were stirred together with 1.22 g. of diethylamine (0.016 mole or equivalent) and 3 g. of acetic acid (0.05 mole) in a total amount of 15 ml. of methanol for 3 hours at 65° C. Subsequently the solvent of the red solution was evaporated and the residue extracted with ether. Purification over a polyamide column of the dried ether extract yielded 260 mg. (=15%) of 5-methyl-4-hydroxyfuran-3-one. Hardly any by-products were formed.

EXAMPLE 18

1.0 g. (0.0067 mole) of D-(+)-xylose was stirred with 1.31 g. (0.0067 mole) of dibenzylamine in 8 ml. of methanol at 65° C. After 20 minutes the colourless solution obtained was stirred for 3 hours at 65° C. with 1.2 g. (0.02 mole) of glacial acetic acid. Subsequently the methanol was evaporated and water was added for the extraction with ether. In this operation some tarry material was formed, which was partly taken up in the ether. In order to remove the various impurities the ether residue was purified over a polyamide column. Yield 55 mg. (=8%) of the desired substance.

EXAMPLE 19

1 g. (0.0067 mole) of xylose was treated with 0.97 g. (0.0067 mole or equivalent) of methyl-n-nonylamine in 10 ml. of methanol at 65° C. After about 15 minutes 1.2 g. (0.02 mole) of acetic acid were added to the colourless, clear solution; the mixture obtained was heated for 3 hours at 65° C. and subsequently worked up as described in the preceding examples. After column chromatography about 70 mg. (=10%) of the desired substance was obtained.

EXAMPLE 20

90 g. D-(+)-xylose (0.60 mole) (ex Merck, biochemical grade, purity higher than 99%) and 44.1 g. diethylamine (0.60 mole or equivalent) were dissolved in 225 ml. methanol at about 60° C. after which stirring was continued for 15 minutes. 108 g. glacial acetic acid (1.8 moles) were added in 10 minutes at a temperature of 60° C. and the reaction mixture was kept at this temperature for 3 hours. After cooling to 35° C. methanol was distilled off under vacuum and 150 ml. water were added. The solution was then extracted with diethyl ether in a liquid-liquid extractor. After drying the ethereal extract over sodium sulphate, 40 g. polyamide were added and the ether was evaporated to dryness.

The product contained in the polyamide was subjected to chromatography over a column of 8 cm. diameter and 30 cm. height which contained 100 g. polyamide. The eluent was light petroleum/ether and chromatography proceeded as indicated below:

| Ratio petroleum/ether | Volume (litres) | Fractions | Yield, g. |
|---|---|---|---|
| 100:0 | 3 | 1-4 | |
| 70:30 | 1 | 5 | |
| 70:30 | 7 | 6-14 | 9.3 |
| | | Residue | 2.3 |

The melting point of the product obtained (9.3 g.=14% calculated on xylose) was 126.5–127.5° C.

What is claimed is:
1. A process for the preparation of 5-methyl-4-hydroxy-2,3-dihydrofuran-3-one in which an N,N-disubstituted glycosylamine of the general formula

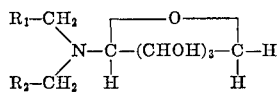

in which $R_1$ and $R_2$ represent the same or different groups and each may be chosen from a hydrogen atom, an aliphatic hydrocarbon group and an aromatic hydrocarbon group, the total number of carbon atoms in said group being at most 40, is heated in a solvent of the group consisting of lower aliphatic alcohols containing 1–6 carbon atoms, dimethyl sulfoxide, N,N-dimethyl formamide or their mixtures, with an aliphatic hydrocarbon carboxylic acid containing 2–22 carbon atoms, and in which the amount of carboxylic acid expressed in equivalents is between 1.5 and 50 calculated on the amount of glycosylamine.

2. A process according to claim 1 in which $R_1$ and $R_2$ represent the same or different groups and each may be chosen from an aliphatic hydrocarbon group and an aromatic hydrocarbon group, the total number of carbon atoms in said group being at most 40, is heated at a temperature from 20 to 120° C. for a period of 0.5 to 15 hours in a solvent of the group consisting of lower aliphatic alcohols containing 1–6 carbon atoms, dimethyl sulfoxide, N,N-dimethyl formamide or their mixtures, containing up to 50% of water, with an aliphatic hydrocarbon carboxylic acid containing up to 22 but at least two carbon atoms, and in which the amount of carboxylic acid expressed in equivalents is between 1.5 and 50 calculated on the amount of glycosylamine.

3. A process according to claim 2 in which $R_1$ and $R_2$ are alkyl groups and contain at most 20 carbon atoms.

4. A process according to claim 2, in which the aliphatic carboxylic acid is a mono-carboxylic acid containing from 2–6 carbon atoms.

5. A process according to claim 3, in which the amount of carboxylic acid expressed in equivalents is between 2 and 5 equivalents calculated on the amount of glycosylamine.

6. A process according to claim 4, in which the polar solvent is an aliphatic alcohol containing up to 6 carbon atoms.

7. A process according to claim 5, in which the reaction temperature is from 50 to 80° C. and the reaction period from 3 to 8 hours.

References Cited

UNITED STATES PATENTS 2,936,308  5/1960  Hodge _____ 260—211

OTHER REFERENCES

Severin et al.: Zeitschrift fur Lebensmittel-Untersuchung und-Forschung, vol. 134, No. 4, Aug. 10, 1967, pp. 230–2.

NICHOLAS S. RIZZO, Primary Examiner

B. I. DENTZ, Assistant Examiner

U.S. Cl. X. R.

96—66; 99—107, 140